Nov. 26, 1968   W. E. NILMEIER ET AL   3,412,855
ARTICLE SIZING APPARATUS
Filed Aug. 15, 1966
2 Sheets-Sheet 1
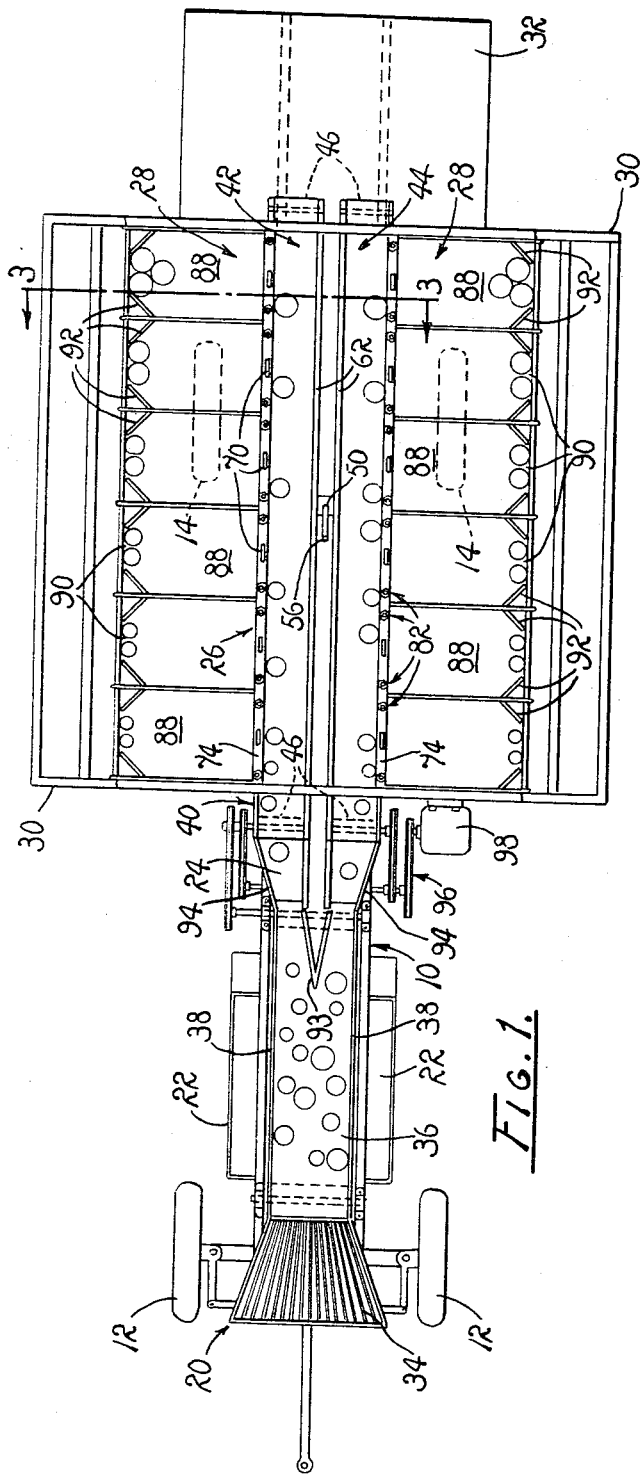
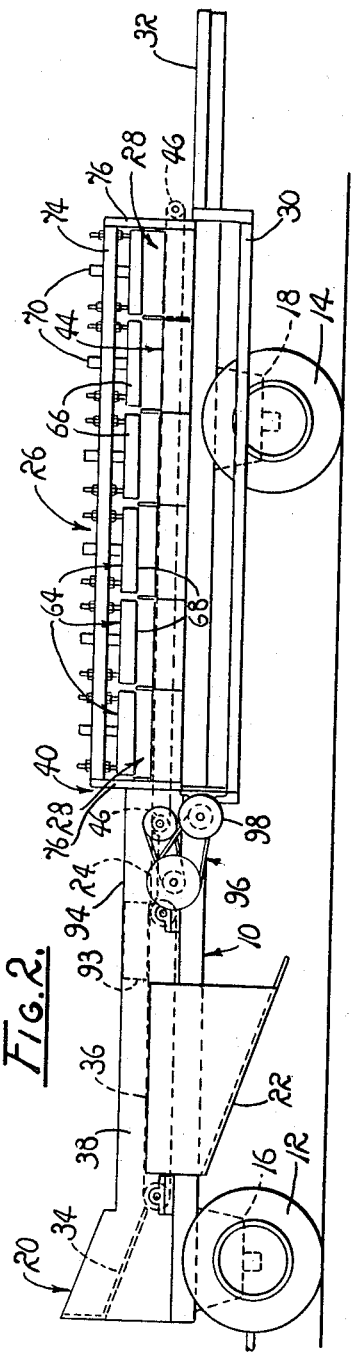
WALTER E. NILMEIER
RALPH S. NILMEIER
INVENTORS
Huebner & Worrel
ATTORNEYS

WALTER E. NILMEIER
RALPH S. NILMEIER
INVENTORS

Huebner & Worrel
ATTORNEYS

United States Patent Office 3,412,855
Patented Nov. 26, 1968

3,412,855
ARTICLE SIZING APPARATUS
Walter E. Nilmeier and Ralph S. Nilmeier, both of 8509 E. Central, Del Rey, Calif. 93616
Filed Aug. 15, 1966, Ser. No. 572,594
4 Claims. (Cl. 209—73)

ABSTRACT OF THE DISCLOSURE

An article sizing apparatus providing a pair of elongated endless conveyors disposed in closely spaced substantially parallel relation individually including upper runs transversely outwardly and downwardly extended from each other for receiving and conveying articles of varying sizes longitudinally therealong for gravitational movement transversely of the conveyors and rolling engagement along sizing gate means disposed longitudinally of the conveyors and therewith defining sizing openings for discharge of the articles at longitudinally spaced locations along the conveyors depending upon the size of the individual articles, and including adjusting means simultaneously and equally to adjust said transverse outward and downward extension of the conveyors to insure substantially uniform sizing of the articles.

---

While the apparatus and method of the present invention are more broadly applicable, they are particularly adapted for the sizing of fruits which, due to their quality and consistency, are susceptible of damage in the nature of bruising if roughly handled or otherwise maltreated.

Heretofore, apparatus for sizing of fruits into selected varying sizes has incorporated mechanism including, for example, grading or sizing openings of progressively increasing sizes along a conveyor for the fruit, and whereon smaller sizes of fruits will fall through smaller openings in proximity to the leading edge of the sizer, and fruits of progressively larger sizes will fall through sizing openings of progressively increasing sizes along the conveyor toward the rear end thereof. In another type of sizing mechanism heretofore utilized, a plurality of conveying wires or bands of progressively diverging configuration from leading end to the trailing end of the conveyor have been used and smaller fruits are permitted to pass through the opening between the wires in proximity to the leading end of the sizer, and progressively increased sizes of fruits fall through and between the progressively diverging wires, dependent upon the size of the fruit and the spacing between the diverging wires. In both of these types of heretofore known apparatus, the fruit is permitted to fall from a selective sizing position onto a subsequent conveyor or into packing boxes or the like. Some fruits are quite susceptible to damage when impinged upon one another, or hard surface, such as for example, peaches, and the heretofore known apparatus has such an inherent drawback resulting in substantial amount of bruised and/or otherwise damaged fruits, which renders the same unmarketable or tends to depreciate the quality thereof.

It is a primary object of the present invention to provide sizing apparatus, particularly adapted for the sizing of relatively spherical configured fruits and fruits which are susceptible of being easily damaged or bruised if permitted to fall from a sizing opening or position to a collecting surface or container.

In effecting the results of the present invention, an apparatus is provided wherein articles or fruit are conveyed along a sizing conveyer in roling engagement therewith, and selective sizing mechanisms are incorporated to size the articles according to desired dimensions thereof, and a so-sized article is then passed into inclined discharge chutes, where again the article is in rolling contact, for subsequent discharge onto conveyors or into packing boxes or crates. The present apparatus prevents any substantial dropping or falling of an article such as fruit during the sizing process, and results in articles having greater consumer desirability and saleability.

An additional object of the present invention resides in incorporating such apparatus in a mobile or portable sizer for fruits which is readily adaptable for use in an orchard in which fruit is being picked, to thereby obviate necessity for intermediate handling and transporting of fruit from the picking area to an area of sizing and packing.

An additional object of the present invention is to provide a fruit sizing apparatus which is of simple, economical and practical construction adaptable for use in a picking area, and including a fruit culling area prior to conveying to a sizing zone, and incorporating sizing mechanisms specifically adapted to prevent damage to fruit being sized, either during conveying of the fruit to selective sizing openings or subsequent discharge through the sizing openings and passage into shipping or handling conveyors.

Additional objects and advantages of the present invention will be more readily apparent from the following detailed description of an embodiment thereof when taken together with the accompanying drawings in which:

FIG. 1 is a plan view of a portable fruit sizing apparatus embodying the invention;

FIG. 2 is a side elevational view of the sizing apparatus of FIG. 1;

Figure 3:
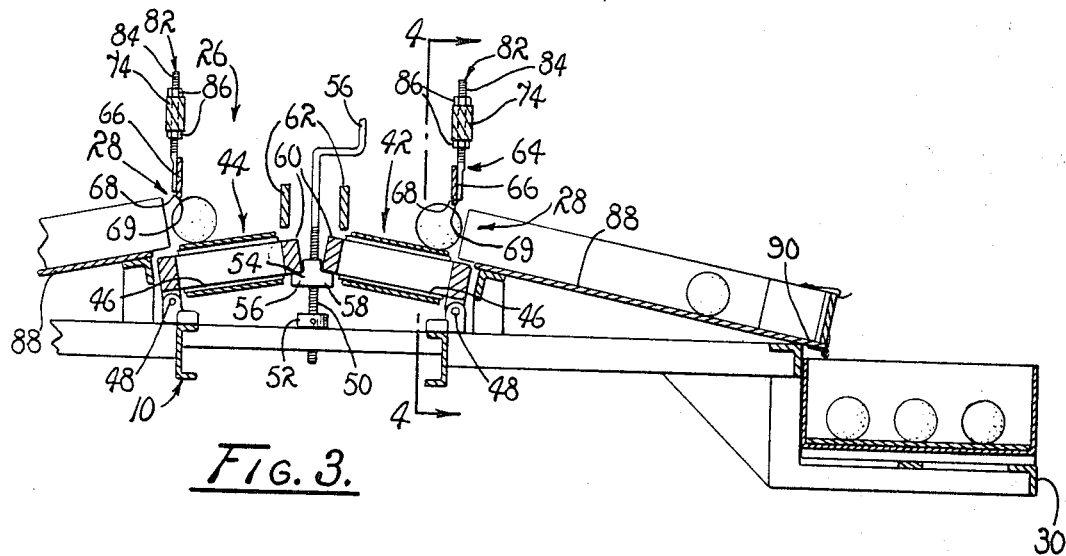
FIG. 3 is a fragmentary enlarged sectional view taken on line 3—3 of FIG. 1.
Figure 4:
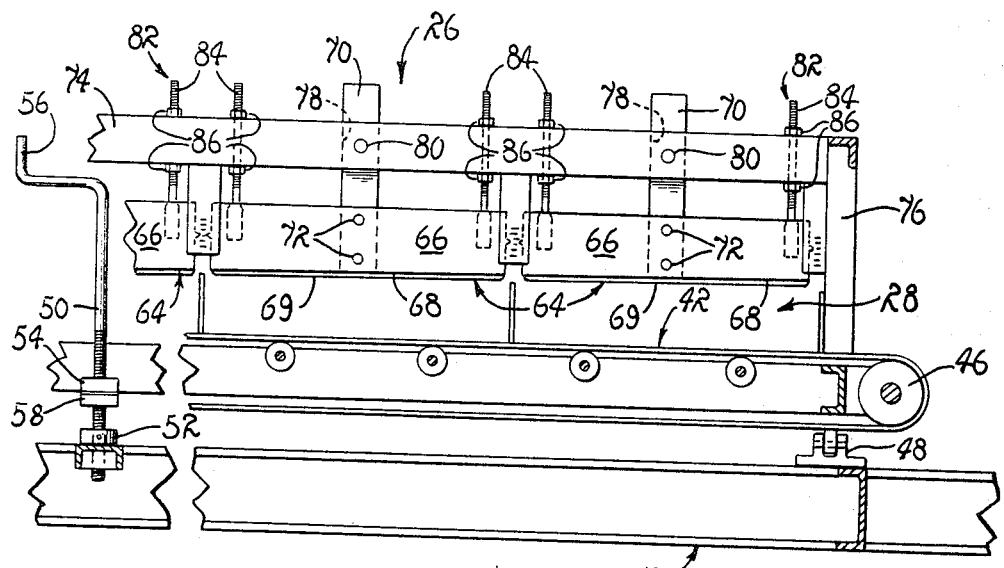
FIG. 4 is an enlarged fragmentary sectional view taken on line 4—4 of FIG. 3.

Referring now in more detail to the drawings, there is shown a preferred embodiment of apparatus for sizing of fruits, in the nature of a portable or mobile vehicle including sequentially spaced stations including a fruit receiving station, a culling station incorporating an endless belt conveyor, a fruit sizing station including canted endless conveyor belts for conveying fruit to be sized in rolling engagement with the belts for selective passage through sizing gates of selected increased fruit passage openings, and sized fruit discharge chutes which are inclined from a receiving end downwardly to a discharge end for conveying sized fruits in rolling engagement therewith and subsequent discharge into containers therefor.

While the invention will be described as applied to a portable or mobile vehicle, it is to be understood that the principles and construction of the apparatus of the present invention are equally applicable to stationary or fixed apparatus for sizing of fruits. As applied to a portable or mobile vehicle, the apparatus includes a chassis generally designated 10 which can, in a usual manner, consist of channel members or the like welded or otherwise secured one to another to form a frame on which the remainder of the apparatus can be mounted. Front and rear wheels 12 and 14 support the frame through turntables or the like 16 and 18, and in some designs the front and rear turntables can be so interconnected as to result in a decreased turning radius for the apparatus making it particularly suitable for manipulation between relatively close successive rows of trees, such as usually exists in a fruit orchard.

From front to rear, the fruit sizing apparatus of the present invention includes a plurality of mechanisms forming successive stations, wherein, a fruit receiving station is indicated at 20, a culling station at 22, an intermediate conveyor belt at 24, a fruit sizing station at 26, and a sized fruit discharge station at 28. A box filling tray or rack 30 is adapted to be mounted on opposite lateral sides of the sizing station to facilitate placement therein of fruit from the discharge stations 28 and, if desired, a lidding deck 32 can be incorporated at the trailing edge of the apparatus for use in a known manner.

The fruit receiving station 20 is slanted from a high leading edge downwardly toward a discharge end, and is preferably padded by appropriate desired means indicated at 34 to prevent bruising of fruits placed therein from individual picking units or containers of picked fruit. Fruits placed in the fruit receiving station 20 roll downwardly onto an endless belt conveyor 36, confined at its lateral sides by uprights 38, and the endless conveyor 36 moves the fruit rearwardly in a cull chute 22, affording time for culling of undesirable fruits or other materials from the sizing apparatus, usually a manual operation effected by one or more workers stationed at opposite sides of the cull chute. The fruit remaining, and which it is desired to selectively size, is then carried on an intermediate conveyor belt 24 to an open receiving end 40 of the sizing portion of the apparatus.

In the sizing station or apparatus, two endless belts 42 and 44 are movably mounted on suitable rollers 46, at opposite ends thereof, in a manner usually associated with endless belt runs. The rollers are pivotally mounted at their outer ends on suitable pivots 48 as shown in FIG. 3 of the drawings. A threaded shaft 50 is adjustably mounted by means of a collar 52, suitably mounted on the frame or chassis 10. An adjustable nut 54, which is internally threaded, is operatively associated with threaded shaft 50 and the latter has a handle 56 at its upper end adapted for rotation of the shaft 50. The adjustable nut 54 includes a collar 58 adapted to support the inner ends 60 of the rollers 46 to permit rotation thereof for movement of the endless belts in a desired manner. It will be apparent that vertical adjustment of shaft 50, by rotation of handle 56, will serve to either raise or lower the inner ends 60 of the rollers to provide a greater or lesser amount of cant or angular disposition of the endless sizing or conveyor belts 42 and 44. The configuration of the fruit to be sized governs the amount of cant or the angular disposition of the belts 42. Substantially spherical fruits require less cant than do out-of-round or non-spherical fruits. The purpose of the angular canting of the belts will be described in more detail hereinafter, but basically the reason for this adjustable disposition is to maintain a rolling contact between fruit being processed and endless conveyor belts therefor. At the inboard ends of the belts upright members 62, in the nature of guide rails, are positioned to confine fruit to a desired path of movement.

Disposed along the longitudinal length of the sizing station, at the outer edges thereof, are a plurality of sizing gates 64. In the drawings, six sizing gates are shown on each lateral side of the sizing station, although this number can be varied as desired. Each sizing gate comprises a sizing board or panel 66 having a bevelled or tapered lower edge 68. Desirably, the lower edges 68 of the sizing gates are covered with a foam rubber strip 69. The purposes of this material will be hereinafter described. Vertically disposed posts 70 are attached to the boards 66, such as by bolts 72 or the like. A longitudinally extending gate support bar 74 is affixed to the chassis by means of upright posts 76, disposed at least at the corners of the sizing station frame, or at other desired positions. Openings 78 are provided through the bars 74, and the vertical posts 70 extend adjustably therethrough. The position of the bars can be adjusted in the opening by intercoaction of pins or setscrews 80 coacting therewith. This construction can assume different forms well known to those skilled in the art. If desired, the openings 78 can be replaced by means of channel shaped brackets or the like, or other known mechanism, to effect the desired purpose.

At each end of each sizing board 66 there is provided an end adjustment means generally designated 82, and which preferably consists of a threaded bolt 84 passing through openings in the support bar 74 and coacting nuts 86. This latter structure permits adjusting the relative position of each end of each board vertically with respect to the plane of travel of the upper run of the belts 42 and 44. The vertical spacing provided between the bolts and the belts results in a sizing gate adapted for passage therethrough of fruit of a selected given size. The bevel or taper of each of the sizing boards is to prevent a squeezing or binding of fruit between the belts and the respective sizing boards as the fruit is conveyed in rolling relationship on the belts, and in rolling engagement with sizing boards spaced along the longitudinal runs of the belts. It will be apparent that fruits of a size approximating the openings of the leading edge of a sizing gate may conceivably become wedged under a sizing board by virtue of the cant of the belts and the proximate gate opening, defined by the vertical disposition of the gate in the sizing station. Fruit closely approximating but smaller than a sizing gate opening will be discharged therethrough, while at the same time fruit of an appreciably greater size will be carried past a specific gate having a small gate opening to a subsequent gate having a greater size opening. The foam rubber or other similar resilient material attached to the lower ends of the sizing gates has been found to facilitate discharge of sized articles under the gates, and additionally serves to prevent bruising of articles such as fruit. Some fruits have a wax like coating on their outer surfaces, and in the absence of the resilient strip the wax has a tendency to build up on the lower surfaces of the sizing gates, and this necessitates cleaning of the gate surfaces. The provision of the resilient strip of material, due to a kneading action of fruit passing in contact thereunder, tends to eliminate a build up or accumulation of wax with manifestly improved operation of the device.

Fruit of appropriate selected sizes which have passed through various of the sizing gates are then directed into one of a plurality of appropriately positioned discharge chutes 88 which are downwardly inclined from a fruit receiving end juxtaposed to the sizing gates towards a discharge end 90, in proximity to which there are positioned baffles 92 to direct a flow of fruit contained therein toward and into a box or the like positioned along rack 30 which serves as a box supporting end filling station. The utilization of the baffles insures a direction of the fruit into a desired positioned box on the rack 30, and tends to prevent fruit from falling outwardly of packing boxes. When boxes have been filled with fruit discharged from the various discharge chutes they may then be placed on the deck 32 for appropriate lidding, and subsequent removal for further transportation as desired.

In order to facilitate the flow of fruit from conveyor 56 in the cull chute 22 onto the intermediate conveyor belt 24, and subsequent discharge onto the sizing belts, a triangular shaped divider 93 is positioned with its nose inserted into the rearward area of the cull chute and terminating approximately at the leading edge of the intermediate belt. A confining belt guard and chute 94 is operably associated with the divider 93 to more appropriately guide the fruit along its path of travel.

The various belts are driven through suitable gearing, or other desired mechanism, broadly indicated at 96 with a source of power consisting of a drive motor 98 of appropriate design.

The construction and function of the present invention and apparatus will be apparent from the foregoing detailed description of an embodiment thereof. Briefly, however, in operation it will be seen that the apparatus and mechanism of the present invention utilizes a rolling contact and engagement with fruit to be sized at all times. This applies to fruit disposed at the padded receiving tray or station 20, the cull chute 22, the intermediate conveyor belt 24, the endless conveyor sizing belts 44 in the fruit sizing stations 26 in conjunction with the sizing gates 64, and during subsequent discharge into and out of discharge chutes 88. At no time during the sizing operation is the fruit dropped over any significant or great distance, and the specific configuration and adjustment of the individual sizing gates prevents a wedging of fruit passing through the fruit sizing station. This results in minimizing to a very substantial extent possible damage or bruising of fruits being sized, and a consequent enhancement of quality, appearance and marketability, with reduction in loss of fruits passing through the apparatus.

As pointed out hereinbefore the principles of the present invention have been described with reference to a portable or mobile fruit sizing mechanism but these principles and construction are equally applicable to stationary units to which fruit can be conveyed by any desired means or methods and to apparatus for sizing articles other than fruit.

Although the invention has been herein shown and described in what is conceived to be the most practical and preferred method and apparatus, it is recognized that departures may be made therefrom within the scope of the invention, which is not to be limited to the details disclosed herein but is to be accorded the full scope of the claims so as to embrace any and all equivalent methods and apparatus.

Having described our invention, what we claim as new and desire to secure by Letters Patent is:

1. An article sizing apparatus comprising a pair of elongated endless conveyors having upper runs, said conveyors being disposed in side-by-side relation whereby they have respective inner and outer edges, means pivotally mounting the outer edges of the conveyors for transverse tipping of the conveyors, adjustable means supporting the inner edges of the conveyors above their outer edges so that they are correspondingly transversely outwardly sloped, means for delivering bulk articles to be sized in a continuous stream to the conveyors whereby such articles are distributed to both conveyors, means driving the conveyors in a common direction whereby the articles are carried therealong while gravitating outwardly to the outer edges, and sizing gate means extended longitudinally along the outer edges of the conveyors and therewith defining sizing openings of progressively larger dimensions in the direction of conveyor travel.

2. The sizing apparatus of claim 1 in which the means supporting the inner edges of the conveyors comprises a screw-threaded shaft mounted for rotation in a substantially erect position between the conveyors at a predetermined elevation, and a nut mounted on the shaft for elevational adjustment incident to shaft rotation having the inner edges of the conveyors rested thereon for corresponding elevational adjustment.

3. An article sizing apparatus comprising a pair of elongated, spaced substantially parallel, longitudinally traveled endless conveyors having opposite predetermined forward and rearward ends, opposite side edges, and upper runs disposed in relatively closely spaced adjacent relation and angularly outwardly and downwardly divergently extended therefrom toward their opposite lower edges for receiving and conveying articles of varying sizes longitudinally therealong and gravitationally toward their lower edges; gate means disposed above said lower edges of the conveyors providing elongated article sizing openings progressively increasing in size from said forward ends of the conveyors to said rearward ends thereof with said articles conveyed in rolling engagement along said conveyors and their respective gate means for discharge through said openings at longitudinally spaced locations depending upon the size of the individual articles; and adjusting means disposed in supporting relation to the inner upper edges of the conveyors simultaneously and equally to adjust their angularity to insure substantially uniform sizing at corresponding transversely opposite locations along the conveyors.

4. The article sizing apparatus of claim 3 in which said adjusting means comprises an elevationally positionable internally screw-threaded nut disposed between said adjacent upper sides of the conveyors and including a collar underlying said upper sides of the conveyors in supporting relation, and crank means screw-threadably extended through said nut for effecting said angular adjustment of the conveyors.

References Cited

UNITED STATES PATENTS

| 729,395 | 5/1903 | Niemann | 109—103 |
| 2,032,258 | 2/1936 | Caton | 193—32 X |
| 2,292,678 | 8/1942 | Vedder | 209—103 |
| 3,193,080 | 7/1965 | Speaker | 198—31 |

FOREIGN PATENTS

| 19,397 | 9/1934 | Australia. |
| 135,177 | 4/1952 | Sweden. |

ALLEN N. KNOWLES, *Primary Examiner.*